United States Patent [19]
Dean

[11] 3,982,072
[45] Sept. 21, 1976

[54] PHONE AID TIMING DEVICE

[76] Inventor: Jerald L. Dean, 419 E. Cass St., Albion, Mich. 49224

[22] Filed: Jan. 8, 1975

[21] Appl. No.: 539,287

[52] U.S. Cl.............................. 179/2 TC; 179/84 C
[51] Int. Cl.² ......................................... H04M 1/21
[58] Field of Search ............ 179/84 C, 6 TA, 2 TC, 179/7.1 R; 58/152 T, 145 K; 200/33 A, 33 R, 38 R, 33 B, 39 R, 39 A

[56] References Cited
UNITED STATES PATENTS

| | | | |
|---|---|---|---|
| 1,270,080 | 6/1918 | Wells | 179/2 TC |
| 2,202,149 | 5/1940 | Gottlieb | 179/7.1 R |
| 3,472,966 | 10/1969 | Simmons | 179/2 TC |
| 3,512,355 | 5/1970 | Lang | 58/152 T |
| 3,818,156 | 6/1974 | Augustyniak | 200/33 R |
| 3,867,584 | 2/1975 | Rengren | 179/84 C |

Primary Examiner—Kathleen H. Claffy
Assistant Examiner—Joseph A. Popek
Attorney, Agent, or Firm—Samuel Kurlandsky

[57] ABSTRACT

A telephone timing device adapted to be mounted on a desk or table telephone having a base unit and a telephone hand set, and having means for engaging the base unit of the telephone. In order to disable the telephone for a predetermined period of time, the hand set including the receiver and transmitter is lifted from the cradle of the phone, thereby permitting the switch on the base unit to close, and thereby disabling the phone with regard to incoming calls. A timing device is provided which may be set to a predetermined time, at which time a spring loaded bolt or plunger is released to engage and depress the switch plunger on the base unit and to open the switch, thereby reactivating the telephone for the reception of external calls.

5 Claims, 6 Drawing Figures

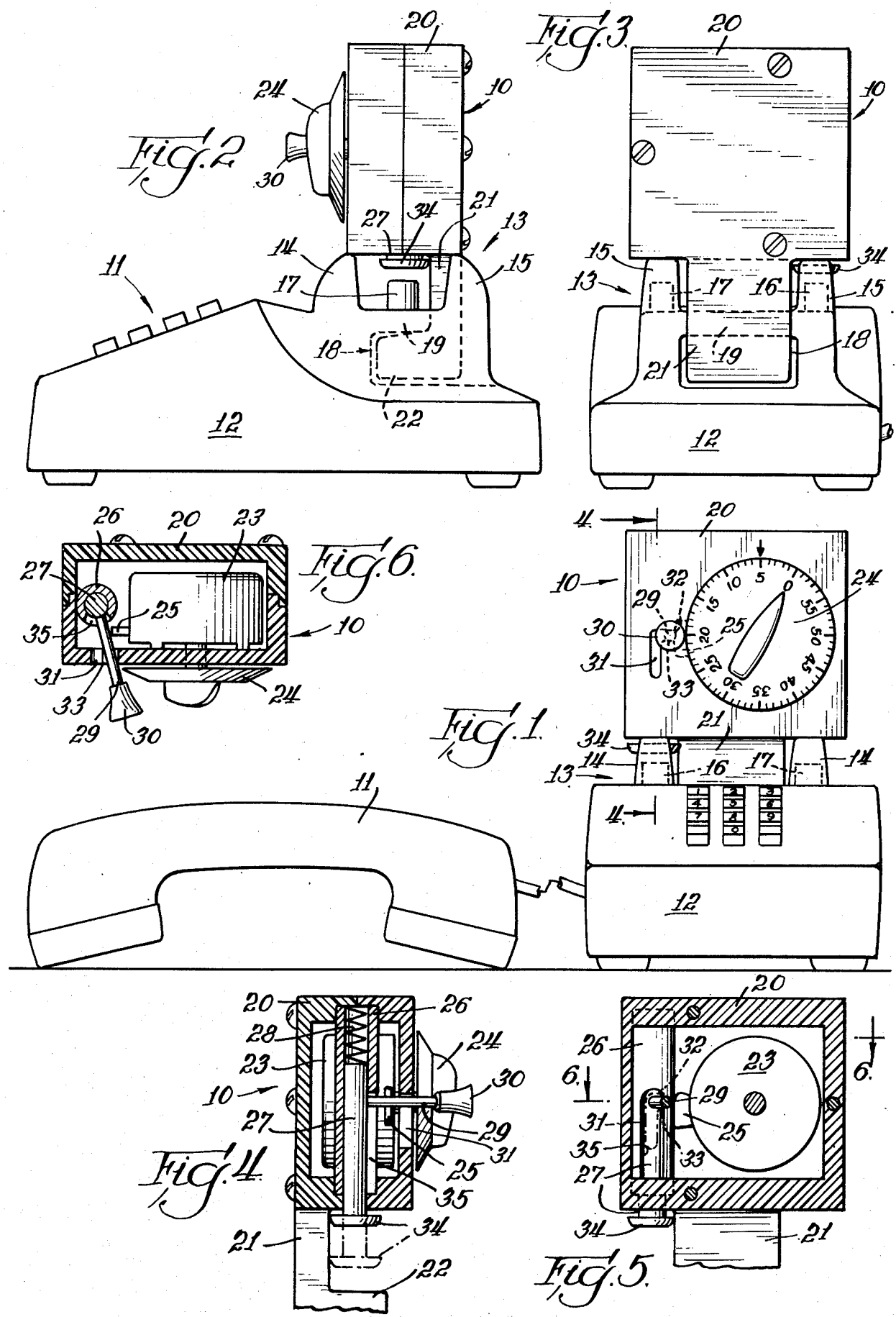

PHONE AID TIMING DEVICE

BACKGROUND OF THE INVENTION

1. Field of the Invention

The present invention relates to telephones and is particularly concerned with a device having timed means for causing the switch button of a telephone to be depressed and the switch to be opened at a predetermined time after the switch has been closed by removing the hand set from its supporting cradle.

2. Prior Art

Telephones generally comprise a telephone base having a number selector in the form of a dial or a pushbutton assembly and having a cradle for resting the telephone hand set including the receiver and transmitter. At least one switch operating plunger or pushbutton is mounted on the telephone base and arranged to be contacted and depressed by the hand set when the hand set is resting on the cradle, thereby opening the switch, but rendering the instrument able to receive incoming calls.

It is often desirable to disable a telephone against incoming calls when, for example, a person wants a period of undisturbed sleep, when he wishes to engage in some activity during which period he does not want to be bothered by incoming phone calls, and in places of business, as for example, pizza houses, to disable the phone for a predetermined period when the workers cannot keep up with orders. It has been conventional to remove the hand set from the cradle, thereby closing the switch, and preventing incoming calls. However, this practice has many drawbacks, since it is quite common for persons who remove the hand set from the cradle to forget to return it. Moreover, it is often inconvenient for a person to return the handset to its cradle because of various activities which cannot be interrupted for this purpose. Various devices have been developed in the prior art for disabling and reactivating telephones. However, they have invariably been complicated and expensive and not always reliable.

SUMMARY OF THE INVENTION

Accordingly, it is an object of the present invention to provide a means for returning a telephone to normal operation as to incoming calls after the telephone has been disabled by removing the hand set from its cradle and permitting the switch to close.

It is an additional object of the invention to provide a device of the type described which can be pre-set to restore a disabled telephone to operating condition in regard to incoming calls after a predetermined period.

It is another object of the invention to provide a device of the type described which may be readily placed on a telephone base and readily maintained in proper operating position.

It is still another object of the invention to provide a device for controlling the disabled time of a telephone, which device is relatively inexpensive to manufacture.

It is still a further purpose of the invention to provide a device of the type described which is simple and reliable in operation.

Still further objects of the invention will appear from the description and drawing.

BRIEF DESCRIPTION OF THE DRAWINGS

FIG. 1 is a front elevational view of a telephone having the timing device of the present invention mounted thereon.

FIG. 2 is a side elevational view of the telephone and timing device of FIG. 1.

FIG. 3 is a rear elevational view of the telephone and timing device of FIGS. 1 and 2.

FIG. 4 is a cross-sectional view taken at the line 4—4 of FIG. 1, looking in the direction of the arrows.

FIG. 5 is a fragmentary front elevational view with the dial and front wall removed to show the timer and bolt, and FIG. 6 is a cross-sectional view taken at the line 6—6 of FIG. 5, looking in the direction of the arrows.

DESCRIPTION OF THE PREFERRED EMBODIMENT

Referring to FIGS. 1–3, the phone timing apparatus 10 of the invention is shown together with a telephone hand set 11, a base unit 12 having a cradle 13 supporting the hand set 11 comprising ears 14 and 15 and switch plungers 16 and 17, at least one plunger being connected to the telephone switch inside the base unit. A recess 18 is provided in the base unit 12 having a horizontal retaining web 19 at the roof thereof.

The timing device 10 comprises a timer frame or housing 20 having a vertical supporting member 21 and a transverse engaging flange or foot 22 adapted to be inserted into the recess 18 and to engage the horizontal retaining web 19 to restrain the apparatus 10 from moving upward.

The timer assembly 23 comprises a dial 24, a cam lever 25 operatively connected to the internal mechanism of the timer. A tubular bolt or plunger housing 26 is mounted in the housing 20 and has a plunger or bolt 27 slidably mounted therein and biased downwardly by means of a coil spring 28. A transverse latching rod 29 is affixed at one end to the bolt 27 and has a handle grip 30. A travel slot 31 is provided in the housing for permitting the latching rod to move upwardly and downwardly, and at the top of the slot 31 is a detent slot 32 defining a detent 33 for engaging and retaining the latching rod in set position. An engaging disc 34 is provided at the end of the bolt 27 for engaging the switch plunger 16. A travel slot 35 is provided in the tubular housing 26 for permitting the latching rod 29 to travel in the tubular housing 26.

To place the telephone timing device in operation when it is desired to disable the telephone with respect to incoming calls, the hand set is removed from the cradle, thereby permitting the switch plunger to rise and to close the switch, thereby so disabling the telephone with respect to incoming calls. The timer dial 24 is then set for the period during which it is desired to have the telephone disabled. The transverse latching rod is then lifted to move the bolt 27 to its uppermost position, and the latching rod 29 moved sufficiently into the detent slot 32 to engage the detent. The device is then placed on the cradle of the phone with the flange 22 disposed in the recess 18 and engaging the retaining web 19. When the dial of the timer reaches the zero position after the preset period, the cam lever 25 moves and pushes the latching rod 29 out of the detent slot 32 and disengaging it from the detent 33. The spring 28 then urges the bolt 27 downwardly, the engaging disc 34 engaging the switch plunger 16 and opening the telephone switch, thereby placing it in the operative condition in which incoming phone calls will once again cause the bell of the telephone to ring.

Although a particular type of timer has been illustrated, other types of timers known in the art may be utilized, including electrically operated timers. The means for depressing the telephone switch plunger has been shown as a spring actuated bolt. Alternatively, other types of actuating means may be used such as electrically operating solenoids or magnets. Means has been shown for mounting on a table type phone having a cradle and a recess below the cradle. However, in the case of wall phones or other types of phones, other mounting means may be utilized such as clamps.

The telephone device of the present invention may be used on any of numerous occasions and for numerous purposes. For example, at times one does not wish the phone to ring when a baby is sleeping, but does not wish to permanently disable the telephone in case he should forget to replace the hand set. The device may be used when one wishes to take a shower or bath and does not wish to be disturbed by the ringing of the telephone during that period, and yet wishes to safeguard against forgetting to replace the hand set. The telephone may also be disabled for a period when one wishes to work in the yard, to lie in the yard to obtain a suntan, to sleep, to swim in a pool, to hang up washed clothes, or even to talk with neighbors without being disturbed. The device may also be used when one wishes to watch a television show and does not want to be disturbed during that period by telephone calls. The device is also useful when one entertains guest and does not wish to be bothered by phone calls.

The present telephone device may also be used in commercial establishments such as in pizza houses or other prepared food establishments at certain periods when they cannot keep up with orders being placed. The device is also useful for people who are somewhat immobilized and want to avoid the need for returning to the phone to hang up the hand set. The device is also useful for people who want to read, to listen to the radio, or to listen to a record player without interruption. In every case the desired activity may be carried out within the preset time, and yet the danger of permanently leaving the hand set off the hook is avoided.

It is to be understood that the invention is not to be limited to the exact details of operation or structure shown and described in the specification and drawing, since obvious modifications and equivalents will be readily apparent to one skilled in the art.

I claim:

1. An apparatus for restoring a telephone to the operable condition with regard to incoming calls after a predetermined interval of time during which the telephone has been disabled by removal of the hand set thereof from the telephone operating switch thereby permitting the switch to close, said apparatus comprising:

a. a frame adapted to be mounted on the base of said telephone when the hand set is removed therefrom, and having means for engaging the telephone base, b. switch operating means adapted to be placed in a first position permitting the telephone operating switch to remain in closed circuit position, and in a second position in which said switch operating means depresses said switch to open the telephone circuit, and driving means for moving said switch operating means from said first to said second position, and c. timer means having means for actuating said driving means for causing said switch operating means to move to said second position after said predetermined time interval, whereby said telephone is once again enabled to receive incoming calls, wherein said switch operating means comprises:
1. a tubular housing,
2. a bolt slidably mounted in said housing,
3. a coil spring biasing said bolt outwardly,
4. latching means connected to said bolt, and means provided in said housing and said frame permitting said latching means to travel with said bolt, and
5. detent means for engaging said latching means when said bolt is in the position in which said spring is compressed, wherein said timer is provided with cam means for disengaging said latching means from said detent means.

2. An apparatus according to claim 1, wherein a vertical support member is provided on said frame terminating in a transverse engaging flange adapted to be inserted into a recess provided in said telephone base and to engage a horizontal web above such recess for preventing said apparatus from moving vertically with respect to said telephone.

3. An apparatus according to claim 1, wherein said spring is a coil spring, wherein a vertical slot is provided in said housing to permit said latching means to travel, and whereby said detent is provided in said housing wall.

4. An apparatus according to claim 1, wherein said latching means is provided with a handle.

5. An apparatus according to claim 1, wherein an engaging disc is provided at the lower end of said bolt for engaging a switch button of said telephone.

* * * * *